United States Patent

Cowans

[15] 3,699,775
[45] Oct. 24, 1972

[54] GAS AND LIQUID PROCESSING SYSTEM

[72] Inventor: Kenneth W. Cowans, Los Angeles, Calif.

[73] Assignee: Sub-Marine Systems Incorporated

[22] Filed: Dec. 11, 1969

[21] Appl. No.: 884,151

[52] U.S. Cl. ............... 62/55, 128/147, 128/DIG. 27, 222/399
[51] Int. Cl. ............................................ F17c 7/02
[58] Field of Search ...... 222/394, 399, 402; 239/143, 239/373; 62/55, 514; 128/142, 147; 137/177, 183

[56] References Cited

UNITED STATES PATENTS

| | | | |
|---|---|---|---|
| 3,260,421 | 7/1966 | Rabussier | 222/394 |
| 3,360,947 | 1/1968 | Fretwell et al. | 62/55 X |
| 3,383,875 | 5/1968 | Haas | 62/55 |
| 3,490,656 | 1/1970 | Taschner | 222/394 |
| 3,548,607 | 12/1970 | Pillsbury, Jr. et al. | 62/55 X |

Primary Examiner—Meyer Perlin
Assistant Examiner—Ronald C. Capossela
Attorney—Fraser and Bogucki

[57] ABSTRACT

In a liquid processing system, a container includes a liquid and a pressurizing gas which is substantially non-reactive with respect to the liquid and establishes a controlled pressure differential between the interior of the container and its surroundings. A porous conduit, extending between the interior and exterior of the container, is maintained in contact with the liquid. The conduit transports liquid along its length, forming a meniscus of extended surface upon portions of the conduit not submerged in the liquid. The meniscus defines a gas barrier; the conduit nevertheless transports fluid at a selected rate between the container and its surroundings. When employed in a cryogenic system, fluid may be transported in response to heat interchange by the container, the rate depending on the temperature change required. The fluid further may be ejected into an extremely high pressure environment without the use of a power source.

14 Claims, 4 Drawing Figures

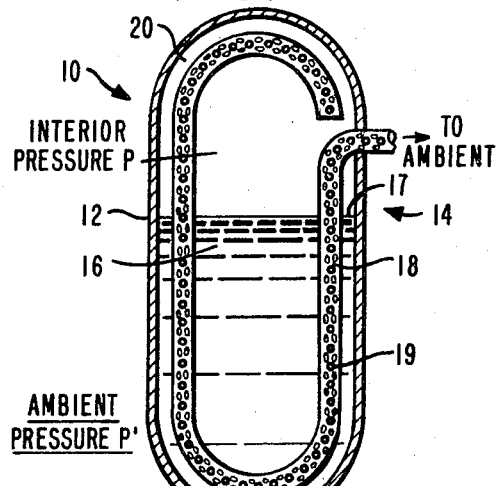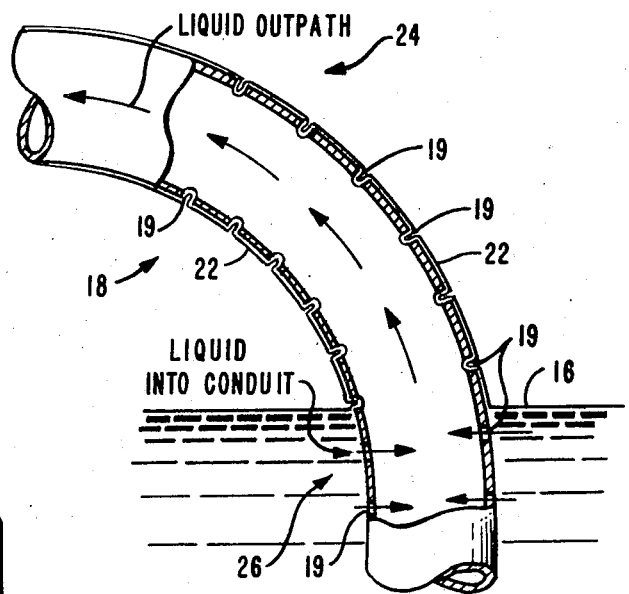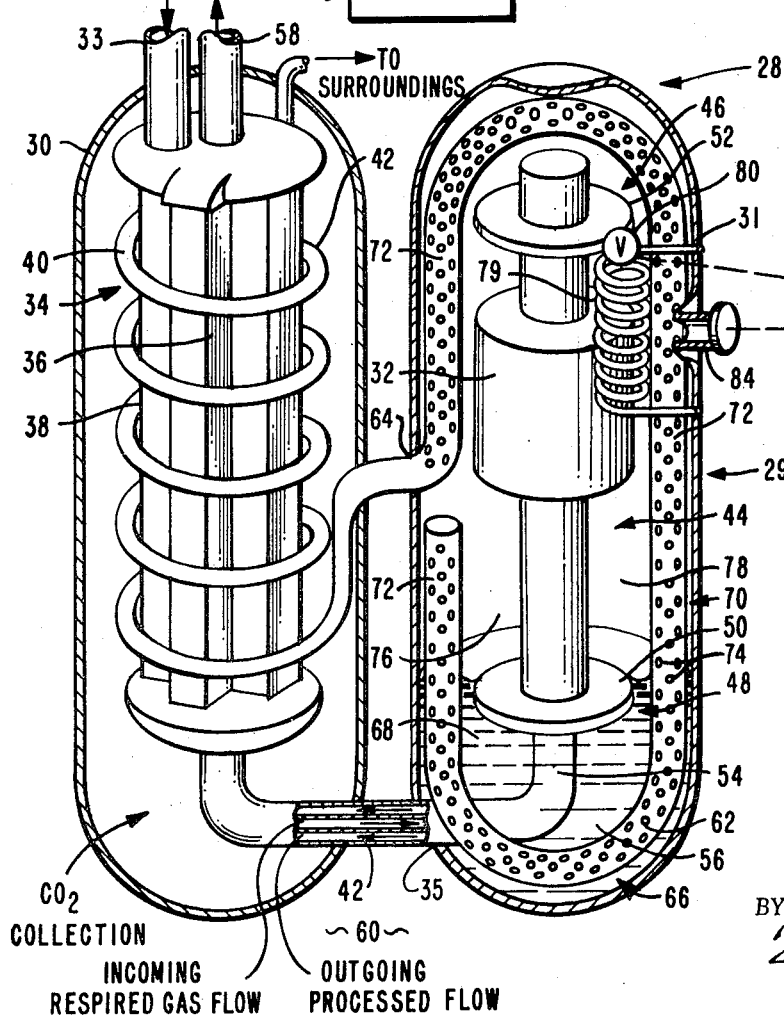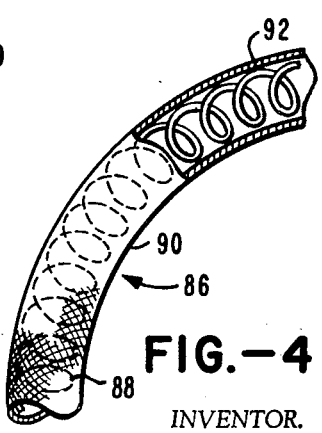
FIG.-1
FIG.-2
FIG.-3
FIG.-4
INVENTOR.
KENNETH W. COWANS
BY Fraser and Bogucki
ATTORNEYS

GAS AND LIQUID PROCESSING SYSTEM

BACKGROUND OF THE INVENTION

1. Field of the Invention

This invention relates to systems for fluid transport and storage, particularly in connection with systems for heat interchange accompanied by controlled temperature variation, including systems for heat absorption at a constant temperature.

2. History of the Prior Art

Compact and portable fluid transport systems particularly in their application to heat interchange systems, including isothermal heat absorption systems operating within the cryogenic temperature range, have become increasingly significant for purposes of life support in hyperbaric, and specifically undersea environments. In copending application Ser. No. 623,616, assigned to the assignee of the present application, is disclosed a life support system which utilizes thermodynamic principles for the maintenance of a desired oxygen level in a diver's breathing system. Such a system incorporates an isothermal heat absorption system which is lightweight, readily portable, and reliable. As disclosed in application Ser. No. 623,616, such isothermal heat absorption systems may comprise a fluid and its vapor at thermodynamic phase equilibrium, arranged to maintain a substantially constant fluid temperature by removing boil-off gases. Powered devices such as mechanical compressors are further disclosed for purposes of ejecting boil-off gases into the extremely high pressure environments. Such mechanical means for transporting fluid meet some of the requirements set forth above, but in some applications prove not entirely satisfactory particularly in extreme conditions.

SUMMARY OF THE INVENTION

The purposes and objectives of the present invention are realized by a fluid processing system utilizing a pressure differential across a liquid-permeable, gas impermeable conduit for transporting liquid between the interior and exterior of the system.

An aspect of the invention is the presence within the system of a pressurizing gas, inert with respect to other system components, providing a selected differential between system and ambient pressure.

Another aspect of the invention is the presence of a porous conduit, connecting the system and its surroundings; the conduit portion within the system is sealed except for the pores. The conduit becomes nonpermeable to gas and permeable to liquid upon contact of any conduit portion with the liquid, thus allowing transport of the liquid without loss of the pressurizing gas as long as any contact between the conduit and the liquid is maintained. This is a consequence of the porosity of the conduit and of a special relation between the conduit and the liquid. The conduit is of a material upon which the liquid forms an extended surface meniscus, sheathing the portion of the conduit which is above the main surface of the fluid. The extended surface of the liquid forms a liquid barrier which blocks passage of the gas, while fluid flows under pressure of the gas along the conduit from the main fluid body.

Another aspect of the invention relates to the convoluted structure of the conduit which is configured to pass adjacent the interior surface of walls of a container for the liquid so that, regardless of orientation of the system, the conduit retains contact with the liquid, thus assuring continuous operation of the system. This aspect of the invention is particularly significant in applications to systems for supplying required liquids from reservoirs undergoing rapid, large changes of orientation such as those supplying fuel to a carburetor of a racing car or, as discussed below in detail, those maintaining the temperature of cryogen reservoirs as used in underwater life support of an active diver.

A heat exchanger system in accordance with the invention utilizes the latent heat of a liquid and its vapor phase in thermodynamic equilibrium with each other for heat exchange between the system and the surroundings. In this system, liquid is transported between the system and its surroundings at a selected rate in response to a selected differential between system and ambient pressure, to maintain system temperature at a constant level or to control its rate of change, during liquid boil-off accompanying system heat absorption or vapor condensation accompanying heat expulsion from the system.

A further aspect of the invention is a storage device for the pressurizing gas whose releasing means is responsive to gas pressure. Constant system pressure and smooth operation may thus be maintained.

Another aspect of the invention is in its application to a life support system particularly adapted for use in hyperbaric environments such as those encountered in deep sea diving. In a particular system in accordance with the invention disclosed in application Ser. No. 623,616, the life supporting gas mixture for the respiring diver passes in a complete circuit between the diver and a processor operating cryogenically to provide oxygen to the flow. The temperature of the processor is maintained by means of a temperature control cryogen, preferably liquid nitrogen. Heat absorption by the temperature control cryogen produces vaporization which would raise the temperature of the system absent means for maintaining gas pressure relatively constant. In systems in accordance with the present invention, temperature control cryogen liquid is removed from the system compensating for the increased number of gas molecules to maintain constant system pressure and temperature.

BRIEF DESCRIPTION OF THE DRAWINGS

FIG. 1 is a partially schematic view of a fluid processing system in accordance with the invention;

FIG. 2 is an enlarged sectional view, illustrating the operation of a conduit in accordance with the invention for the system of FIG. 3;

FIG. 3 is a partially broken away perspective view of a life support system in accordance with the invention; and FIG. 4 is a perspective view of the conduit of FIG. 2.

DETAILED DESCRIPTION OF THE INVENTION

FIG. 1 illustrates a fluid processor 10 in accordance with the invention. A vessel 12 sealed to its surroundings 14 contains a liquid 16 to be transported between its interior and exterior. The liquid 16 has a main surface 17. A porous conduit 18 with pores 19 in contact with the liquid 16 extends from the interior to the exterior of the vessel 12. A pressurizing gas 20 is present within the vessel 12 at a selected pressure $P$ to provide a selected pressure differential with ambient pressure $P'$. When it is in contact with the liquid 16, the conduit 18, as shown in connection with FIG. 2 below, is permeable to the liquid 16 and impermeable to the gas 20 and comprises in effect a selective gas barrier and liquid path for flow under the impetus of the pressure differential $P-P'$, whereby the liquid is transported and the pressurizing gas confined to the vessel 12. For efficiency and smooth operation, the pressurizing gas is preferably physically and chemically inert with respect to the vessel 12 and the liquid 16.

Liquid may flow into or out of the vessel 12 depending on the sign of the pressure differential $P-P'$ and at a selected rate related to its magnitude.

FIG. 2 illustrates in detail the operation of a porous conduit 18 which is partially submerged in a liquid 16 wherein the pressure differential $P-P'$ is positive (the direction of liquid flow would be reversed if $P-P'$ were negative). A meniscus 22, which forms over a non-submerged portion 24 of the conduit 18, sheaths the portion 24 with an extended surface of the liquid 16. The meniscus is a consequence of the interplay between molecular attraction between the material of the conduit 18 and the surface tension of the liquid 16, frequently designated "capillary action". The meniscus 22 draws up a portion of the liquid surface 17 as it rises. In a pore 19 in the conduit 18, a portion of the liquid 16 drawn up forms in effect a liquid plug which prohibits entry of any gas molecules into the conduit 18 through the pore 19. There is substantially no pressure difference across the surface of the portion of the conduit 19 in the gas filled volume, because fluid flow between the interior and exterior of the conduit 19 substantially equalizes exterior and interior conduit pressure, with the negligible exception of an additional pressure differential due to flow resistance which is negligible under design criteria, well known to those skilled in the art, for such conduits. Consequently, the meniscus is stable because there is substantially no pressure differential across the meniscus except that due to the liquid column, which arose from capillary action in the conduit in the first place, and which — in accordance with well-known laws of fluid mechanics — is thus supportable by the meniscus formed through the capillary action. In this manner, loss of the pressurizing gas 20 is confined to that which dissolves in the liquid 16. In a practical example of a system in accordance with the invention in which the gas 20 is helium and the liquid 16 is liquid nitrogen, less than one-half of 1 percent of the gas molecules dissolved and the system operated for an extended period of time without decrease in helium pressure. Consequently, the system operates with high efficiency with respect to retention of the pressurizing gas.

Submerged portion 26 of the conduit 18 has no meniscus formed over it since there is a liquid-liquid interface there. Fluid thus enters the conduit 18 through the pores 19 of the submerged portion 26 in response to the pressure exerted by the pressurizing gas 20. The consequence of this arrangement in accordance with the invention is that the conduit 18 is permeable to the liquid 16 and impermeable to the pressurizing gas 20.

As illustrated in FIG. 1, the conduit is in the form of a loop and passes close to the interior surfaces of the walls of the vessel 12. For this reason, regardless of the orientation of the vessel 12, a portion of the conduit 18 contacts the liquid 16 whenever the amount of liquid 16 in the vessel 12 exceeds a certain minimum amount.

Under a change of orientation of the vessel 12, the position of the conduit 18 changes relative to the liquid 16; previously submerged portions are exposed and previously exposed portions, submerged. Under these circumstances, a meniscus is left upon the newly-exposed portions by the retreating liquid and the meniscus previously formed upon the newly submerged portions disappears upon submergence. Thus, the system maintains uninterrupted operation as long as a portion of the conduit 18 is in contact with the liquid 16. Consequently, a system with a conduit like that illustrated may continue to operate as long as more than a small, minimum amount of the liquid remains in the container. In a practical example, the system operated with one inch of liquid remaining in a twelve-inch long cylindrical container.

FIG. 3 illustrates a self-contained underwater breathing apparatus (scuba) system 28, including a fluid processor 29, in accordance with the invention. The scuba utilizes an oxygen processor 32 comprising an oxygen liquid-vapor system in phase equilibrium at a selected cryogenic temperature controlled by a temperature control cryogen to maintain a required level of oxygen partial pressure in life support for a user in a hyperbaric, specifically undersea, environment as described in previously filed application Ser. No. 623,616. In the scuba system, incoming respiratory exhaust gases expired by the user are cooled by heat exchange with outgoing processed gases passing from the oxygen processor 32, reoxygenated by passage through the processor 32, and recirculated to the user after heat exchange with incoming respiratory exhaust gases.

Cylindrical tanks 30, 31 substantially contain the scuba 28. Exhaust respiratory gases enter tank 30 through an inlet conduit 33 which is connected with a breather mechanism typically a mouthpiece (not shown) and a breather bag (not shown) and pass into a heat exchange system 34 comprising a principal heat exchanger 36 and bypass heat exchanger (not shown), both of the counterflow type. A major portion (95–99 percent) of the flow passes through heat exchanger 36; the rest, through the bypass heat exchanger. Heat exchanger 36 comprises a metallic rectangular body 38 about which is coiled copper tubing 40 serving as a conduit for cold counterflow of temperature control cryogen, which is liquid nitrogen in one practical example. During this heat exchange $CO_2$ is frozen out of the gas and falls freely to the bottom of tank 30. After recombination of the separated principal and bypass gas streams, the incoming gas flows through a coaxial conduit 42 comprising a sleeve about an inner conduit and connecting tanks 30, 31, through an orifice 35 in tank 31, the gas flowing in heat exchange relation with a coaxial counterflow of outgoing cold processed gas in the outer conduit.

The incoming gas then encounters within the tank 31 an isothermal heat exchange system 44 comprising two isothermal counterflow heat exchangers 46, 48.

The isothermal heat exchangers 44, 48 comprise, respectively, wicking members 50, 52 which are in the form of hollow bodies of revolution with axes coincident with or close to the axis of the tank 31. The wicking members 50, 52 are disposed adjacent the lower and upper ends of the tank 31, respectively. (The terms "upper" and "lower" are used for convenience only to refer to the plane of the Figure and not to actual operation or orientation of the system, which operates in any attitude.) The wicking members are arranged so that at least one wicking member will be in contact with a temperature control cryogen 56 within the tank 31 regardless of attitude of the tank whenever a certain minimum volume of the tank is occupied by the cryogen, 10 percent in one practical example. The cryogen wets the entire wicking member or flange.

The temperature control cryogen 56, which in a practical example comprises liquid nitrogen, is thermodynamically connected to the processor 32 and to a processor coaxial conduit system 54 which contains the incoming and outgoing gas as inner and outer flows, respectively. The wicking members 50, 52 and associated flanges are connected thermodynamically with conduit 54 by means of interior conductive members such as a porous heat pipe (not shown) of high heat conductivity. In this manner, the conduit 54 and the gases it contains are in thermal contact with the cryogen 56. The conduit 54 is connected with the processor 32; thus, after the incoming gas passes in thermodynamic contact with both wicking members 50, 52, it passes to the processor 32, comprising a vessel containing an oxygen liquid-vapor system in thermodynamic phase equilibrium at a cryogenic temperature, at substantially the temperature of the oxygen and is reoxygenated by circulating in intimate contact with highly extended surfaces (not shown) of the liquid oxygen. The flow then recirculates to the user as a processed, oxygenated gas mixture via the outer conduit path described above and an outlet conduit 58 connected to the breather mechanism.

The liquid processor 29 controls the liquid nitrogen volume within tank 31 to maintain a desired temperature of the control cryogen and thus of the entire oxygen processor 32 during heat absorption. The relation of the nitrogen volume to system temperature is indicated below in the discussion in connection with Equations 1–3.

The interior of container 31 communicates with the surroundings 60 by means of a porous liquid conduit 62 which is closed at its end within the container. Otherwise, the container 31 is sealed against the environment, except for a pressure communicating connection 84 described below. The conduit passes through an orifice 64 in a wall of the container 31. A submerged portion 66 of the conduit 62 extends beneath a main surface 68 above the main body of the liquid nitrogen 56. A non-submerged portion 70 of the conduit 62 extends between the main surface 68 and the orifice 64. A meniscus 72, comprising an extended surface of the liquid 56, sheaths the non-submerged conduit portion 70 with a layer of liquid 56. The conduit 62 has regularly distributed pores 74 along its extent within the container 31. Nitrogen vapor 76 is in thermodynamic phase equilibrium with the liquid nitrogen 56 and occupies the volume of the container 31 above the liquid 56.

A pressurizing gas 78, which is non-reactive physically or chemically with the vapor 76 or the liquid 56, is also present in the volume of the container 31 above the liquid 56. In a practical example, the pressurizing gas comprises helium. The pressurizing gas 78 is at a selected pressure P; the surroundings 60 of the container 31 are at a pressure P'.

The thermodynamic relationship between the liquid 56 and its vapor 76 is governed by the Clausius-Clapeyron equation:

$$(dP)/(dT) = (\lambda)/(T\Delta V) \qquad \text{(Equation 1)}$$

where $P$ represents the pressure in a gas-liquid system at thermodynamic phase equilibrium; $T$ represents temperature of such a system; $\lambda$ represents specific heat of phase transformation of the components of the liquid-vapor system; and $\Delta V$ represents the specific volume difference between the gas and liquid phases. Upon heat absorption by the liquid 56, which is reflected in a "boiling-off" of molecules from the fluid 56 into the gaseous state and into the volume above the fluid, the number of molecules in the vapor 76 increases.

The ideal gas relationship, which is qualitatively sufficiently accurate for illustrative purposes, is as follows:

$$PV = nRT \qquad \text{(Equation 2)}$$

where $V$ represents the volume of gas in a container; $R$ represents Boltzmanns' constant; $n$ represents the moles of gas present in the container and $P$ represents pressure within the container. Thus, for a small increase in the number of molecules of the vapor, at constant temperature, the following equation holds:

$$Pdv + VdP = RTdn \qquad \text{(Equation 3)}$$

Because the increased volume available to the gas due to the escape of a small number of molecules from the liquid upon vaporization is small, the term on the left side of the equation involving $dP$ will predominate, with a resulting tendency toward an increase in pressure. As indicated in Equation 1, temperature increases with increasing pressure. In order to keep the temperature constant, consequently, there must be a sufficient increase in the volume available to the gas to compensate for the increased number of gas molecules.

Under the impetus of the pressure differential $P-P'$, which is selected to provide the proper transport rate, quantities of the liquid 56 are removed from the tank 31 in response to heat absorption by the cryogen.

The fluid processing system may, of course, be operated in a reverse manner. Under such a mode of operation, liquid enters the container 31 through the conduit 62, in response to a reversion to the liquid state of molecules of the vapor 76 caused by loss of heat by the system. The pressure differential between the interior of the container 31 and the surroundings 60 is reversed in sense from that of the above-discussed example.

A storage coil 79 for the pressurizing gas 78 is present within the container 31. A pressure responsive gas release valve 80 of a standard type is connected to a conventional pressure sensor 82; the sensor 82 communicates with the portion of the interior volume of the container 31 outside of the liquid 56 by means of a conventional pressure communicating connection 84.

Thus, pressure of the pressurizing gas 78 in the container 31 may be maintained at the proper working level by means of continuing adjustment of the amount of the pressurizing gas, which is released by the pressure responsive valve 80.

A heat exchanger (not shown) may be provided in conjunction with pressure connection 84 in order to insulate the pressure sensor 82 from the cryogenic temperature of the interior container 31.

FIG. 4 illustrates the structure of a particular conduit 86 in accordance with the invention. The conduit 86 comprises a flexible member or coil element shown as a helical steel spring 88, about one-quarter inch in diameter, and a stainless steel 5 micron cloth 90 a few thousandths of an inch in thickness and having apertures no larger than about 5 microns in diameter sheathing or tightly encasing the portions of the spring 88 to be included in a sealed vessel in accordance with the invention. The five micron cloth 90 is fastened by seam welding. In a portion of the conduit adjacent an orifice (not shown) of a sealed vessel (not shown) in a system in accordance with the invention, a stiffener copper tube 92 is soldered between the spring 88 and the micron cloth 90 for increased stiffness.

The invention is not limited in scope to the specific embodiments set forth above; rather, the invention is to be considered to include systems and methods, falling within the scope of the invention as set forth below in the appended claims.

What is claimed is:

1. A liquid processing system for transporting liquid through a pressure differential between ambient pressure and internal pressure by internally generated forces, comprising:
   a closed vessel having at least one orifice;
   pressurizing gas within the vessel; and
   liquid-permeable conduit means extending between the interior and the exterior of the vessel through the orifice, said conduit means being in sealed relation to the orifice and being impermeable to the gas when substantially any portion of said conduit means is in contact with the liquid.

2. The invention as set forth in claim 1 wherein said liquid-permeable conduit means contacts the liquid substantially independently of attitude of the vessel.

3. The invention as set forth in claim 1 wherein said gas is maintained at a selected pressure to control liquid transport rate.

4. The invention as set forth in claim 1 wherein said conduit comprises at least one porous tube, an extended surface of the liquid being formable upon said porous tube during contact between said porous tube and said liquid.

5. The invention as set forth in claim 4 wherein a liquid is disposed within said vessel, said liquid having a main body and a main surface, said main surface being associated with said main body, and wherein said extended surface is disposed over substantially all of said at least one porous tube surface which is within said vessel and extends outside said main body of liquid.

6. The invention as set forth in claim 2 wherein pressure within the vessel is greater than the ambient pressure, and wherein said porous tube comprises a coil element and a stainless steel micron cloth having apertures no larger than approximately five microns in diameter, said stainless steel micron cloth enclosing said coil element and being seam welded thereto, said porous tube being disposed adjacent the interior surface of said vessel.

7. A system for heat interchange with controlled accompanying temperature variation, including zero variation, comprising:
   a closed vessel having at least one orifice;
   a liquid within said vessel substantially in thermodynamic phase equilibrium with a first gas comprising a vapor of said liquid, said liquid having a main surface and a main body, said surface being associated with said main body;
   liquid permeable conduit means for transporting liquid between the interior and exterior of said vessel at rates related to desired temperature variation rates under heat interchange, said conduit means being impermeable to said gas while substantially any portion of said conduit means is in contact with said liquid; and
   means for providing a pressure differential between the interior and exterior of said vessel.

8. The invention as set forth in claim 7 wherein said conduit means comprises a porous tube communicating with the exterior of said vessel through said orifice in said vessel, an extended surface of said liquid being disposed over any portion of said porous tube within said vessel which extends outside said main body of said liquid.

9. The invention as set forth in claim 8 wherein at least a portion of said porous tube contacts said liquid in substantially all orientations of said vessel.

10. The invention as set forth in claim 8 wherein at least a portion of said porous tube passes adjacent at least one interior surface of said vessel.

11. The invention as set forth in claim 8 wherein said conduit comprises a flexible member having a porous surface wherein the heat interchange comprises isothermal heat absorption by the system and wherein said porous tube contacts said liquid in all orientations of said vessel when said vessel is filled with liquid to about 10% or more of its volume.

12. The invention as set forth in claim 8 wherein said means for providing the pressure differential comprises a second gas within said vessel, said second gas being substantially nonreactive with said first gas and said liquid.

13. The invention as set forth in claim 9 further including means responsive to pressure within the vessel for varying the amount of said second gas within the vessel to maintain a selected pressure differential between the interior and exterior of the vessel.

14. The invention as set forth in claim 9 wherein said heat interchange comprises isothermal heat absorption by said liquid from a flow of fluid in thermal contact therewith, wherein said conduit comprises a helical steel spring, a stainless steel porous fine micron cloth having apertures of about 5 micron size and a stiffener, said stainless steel micron cloth sheathing said helical steel spring and defining the boundary of said conduit means and being seam welded to said helical steel spring except in at least one portion of said porous tube adjacent said orifice wherein said stiffener comprising a copper tube encloses said helical steel spring and is soldered thereto and to said stainless steel micron cloth;

wherein said liquid comprises liquid nitrogen; and wherein said porous tube is disposed adjacent the interior surface of said vessel.

* * * * *